(12) United States Patent
Liu et al.

(10) Patent No.: US 6,388,353 B1
(45) Date of Patent: May 14, 2002

(54) ELONGATED PERMANENT MAGNET SYNCHRONOUS MOTOR

(75) Inventors: Joseph C. Liu, Tulsa, OK (US); Richard Savoie, Ojeda Zvlia (VE); Dale Smith, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/539,083

(22) Filed: Mar. 30, 2000

(51) Int. Cl.[7] .................. H02K 21/14; H02K 15/03; F04B 17/00
(52) U.S. Cl. ............... 310/156.09; 310/156.09; 310/156.47; 310/87; 310/114; 417/423.7
(58) Field of Search .............. 310/87, 156.47, 310/156.08, 156.09, 156.11, 112, 114; 417/410.1, 423.7, 424.1, 424.2

(56) References Cited

U.S. PATENT DOCUMENTS

| | | | |
|---|---|---|---|
| 2,976,807 A | 3/1961 | Hill | 103/11 |
| 3,568,771 A | 3/1971 | Vincent et al. | 166/250 |
| 3,751,192 A | 8/1973 | Boyd | 417/411 |
| 3,753,060 A | 8/1973 | Greenwell | 318/227 |
| 3,753,062 A | 8/1973 | Greenwell | 318/225 R |
| 3,780,324 A | 12/1973 | Greenwell | 310/180 |
| 3,838,322 A | 9/1974 | Greenwell | 318/225 R |
| 3,854,077 A | 12/1974 | Greenwell | 318/227 |
| 4,284,943 A | 8/1981 | Rowe | 318/806 |
| 4,370,098 A | 1/1983 | McClain et al. | 417/18 |
| 4,718,824 A | 1/1988 | Cholet et al. | 417/14 |
| 4,918,831 A | * 4/1990 | Kliman | 29/598 |
| 5,017,087 A | 5/1991 | Sneddon | 415/72 |
| 5,179,306 A | * 1/1993 | Nasar | 310/14 |
| 5,355,044 A | * 10/1994 | Uchida et al. | 310/162 |
| 5,378,374 A | 1/1995 | Andersen | 210/743 |
| 5,407,337 A | 4/1995 | Appleby | 418/166 |
| 5,708,337 A | 1/1998 | Breit et al. | 318/439 |
| 5,951,262 A | 9/1999 | Hartman | 417/356 |

* cited by examiner

Primary Examiner—Burton S. Mullins
(74) Attorney, Agent, or Firm—Fletcher, Yoder & Van Someren

(57) ABSTRACT

A permanent magnet synchronous motor system. The system uses a permanent magnet AC synchronous motor having an elongated housing, of the type used in progressive cavity pumping applications. Within the stator, a multi-section rotor is rotatably mounted. The rotor includes a plurality of rotor sections that are angularly offset from each other. The rotor sections are mounted on a drive shaft, and the sum of the offsets is generally comparable to the angular displacement undergone by the drive shaft under a normal operating load.

22 Claims, 5 Drawing Sheets

US 6,388,353 B1

ELONGATED PERMANENT MAGNET SYNCHRONOUS MOTOR

FIELD OF THE INVENTION

The present invention relates generally to electric motors, and particularly to elongated permanent magnet synchronous motors utilized in, for example, downhole, progressive cavity pumping systems.

BACKGROUND OF THE INVENTION

In a variety of applications, it is advantageous to utilize an elongated motor having a relatively long stator and rotor mounted therein. For example, elongated induction motors are utilized in progressive cavity pumping applications, because they can be designed to fit within the confines of a wellbore. Induction motors are also beneficial in that they are not detrimentally affected by shaft twist due to loading of the elongated motor. However, the rotational speed of induction motors is relatively high and varies with load. In some applications, such as downhole progressive cavity (PC) pump systems, it would be advantageous to utilize a motor that operates at a lower rotational speed than an induction motor.

In PC Pump applications, for instance, conventional motors must be combined with a gearbox to reduce the rotational speed of the output shaft. A gearbox adds expense and complexity to the overall system.

Permanent magnet synchronous motors can be designed to operate at a lower speed that remains constant over certain ranges of variable load. However, an elongated permanent magnet synchronous motor is very susceptible to shaft twist. When a sufficient load is placed on the driving shaft, the resultant twisting tends to move the permanent magnets that are mounted on the rotors out of the optimal or desired rotational position relative to the stator. Permanent magnet synchronous motors are also difficult to start from a remote location. For example, if a permanent magnet synchronous motor is used in a downhole, wellbore environment, it is difficult to start the motor with a conventional controller disposed at the surface of the earth.

It would be advantageous to have a permanent magnet synchronous motor designed to self start in a downhole location and to compensate for the amount of shaft twist that occurs under normal loading.

SUMMARY OF THE INVENTION

The present invention features a permanent magnet synchronous motor system. The system comprises a permanent magnet synchronous motor including an elongated housing. A stator is disposed within the housing and includes a plurality of windings. Additionally, a rotor is rotatably disposed within the stator and includes a plurality of rotor sections. Each rotor section includes several permanent magnets that lie generally parallel with the axis of the rotor section. When the rotor sections are mounted on the shaft, the permanent magnets of adjacent or sequential rotor sections are offset from each other a predetermined angular displacement. The sum of the predetermined angular displacements is approximately equal to the angular displacement of the shaft under a given load.

According to another aspect of the present invention, a progressive cavity submersible pumping system is designed for use within a wellbore. The system includes a progressive cavity pump driven by a permanent magnet synchronous motor. Both the progressive cavity pump and the permanent magnet synchronous motor are designed for deployment in a wellbore to pump a wellbore fluid. The system also includes a variable speed drive able to output a three-phase alternating current. A power cable connects the variable speed drive to the permanent magnet synchronous motor to directly supply alternating current from a remote location to the submersed motor.

According to another aspect of the present invention, a method is provided for counteracting the effects due to shaft twist in an electric motor under load. The method includes mounting a first rotor section and a second rotor section within a stator. Additionally, the method includes attaching a first plurality of permanent magnets along the first rotor section and a second plurality of permanent magnets along the second rotor section. The first plurality of magnets is angularly offset with respect to the second plurality of magnets.

According to another aspect of the present invention, a progressive cavity pumping system is provided. The system includes a progressive cavity pump and a permanent magnet synchronous motor coupled to the progressive cavity pump. The output of the motor is directly coupled to the pump such that the pump rotates at the motor speed. In other words, the rotational speed of the permanent magnet synchronous motor and the progressive cavity pump are generally at a 1:1 ratio.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
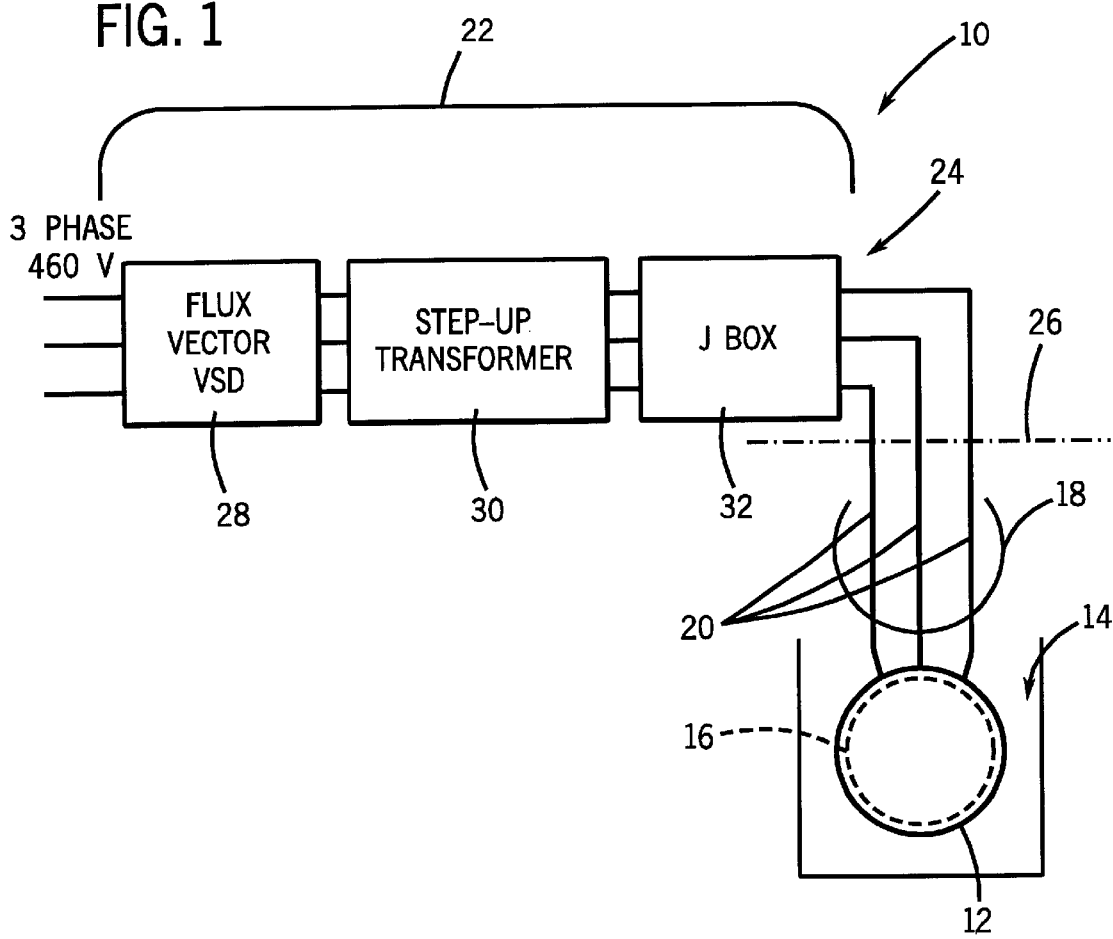
FIG. 1 is a schematic representation of a submersible pumping system utilizing a permanent magnet synchronous motor supplied with alternating current from a remote location, according to a preferred embodiment of the present invention.

Referring generally to FIG. 1, a schematic representation of a permanent magnet synchronous motor system 10 is illustrated according to a preferred embodiment of the present invention. System 10 includes a progressive cavity pumping system 12 disposed within a wellbore 14. Progressive cavity pumping system 12 includes an electric motor 16 that receives power via a power cable 18. Typically, power cable 18 includes at least three conductors 20 for carrying three-phase power, such as 460 volt, three-phase power. By way of example, electric motor 16 is a three-phase, eight-pole permanent magnet AC synchronous motor designed to operate on three-phase power.

In the embodiment illustrated, an alternating current is supplied to electric motor 16 via power cable 18 from a control system 22 disposed at a remote location 24. An exemplary remote location 24 is at or above a surface 26 of the earth. An exemplary control system 22 includes a variable speed drive 28, such as a flux vector-type variable speed drive. An exemplary drive is the Reda Speed Star 2000®, available from Reda Production Systems of Bartlesville, Okla. Additionally, control system 22 may include a transformer 30 coupled to variable speed drive 28. Transformer 30 is designed to step up the voltage, as necessary, for certain applications. Furthermore, transformer 30 is designed to eliminate the possibility of magnetic saturation at low frequency. A junction box 32 is utilized to connect transformer 30 with power cable 18.

The unique arrangement of control system 22 and motor 16 of progressive cavity pumping system 12 permits consistent, dependable running and self-starting of progressive cavity pumping system 12. Preferably, motor 16 is an eight-pole motor designed to operate at a relatively slow speed in the range from approximately 12 to 40 Hz. The alternating current can be supplied directly from control system 22 at a remote location 24. Thus, if progressive cavity pumping system 12 is deep within a wellbore, e.g. 3000 feet or more, motor 16 is able to consistently self-start and operate. Preferably, motor 16 also utilizes high energy permanent magnets, such as samarium cobalt ($SmCo_5$) magnets. The use of a motor having a greater number of poles, e.g. an eight-pole or twelve-pole motor with such high energy permanent magnets permits the motor to be started from a location remote from the motor.

Figure 2:
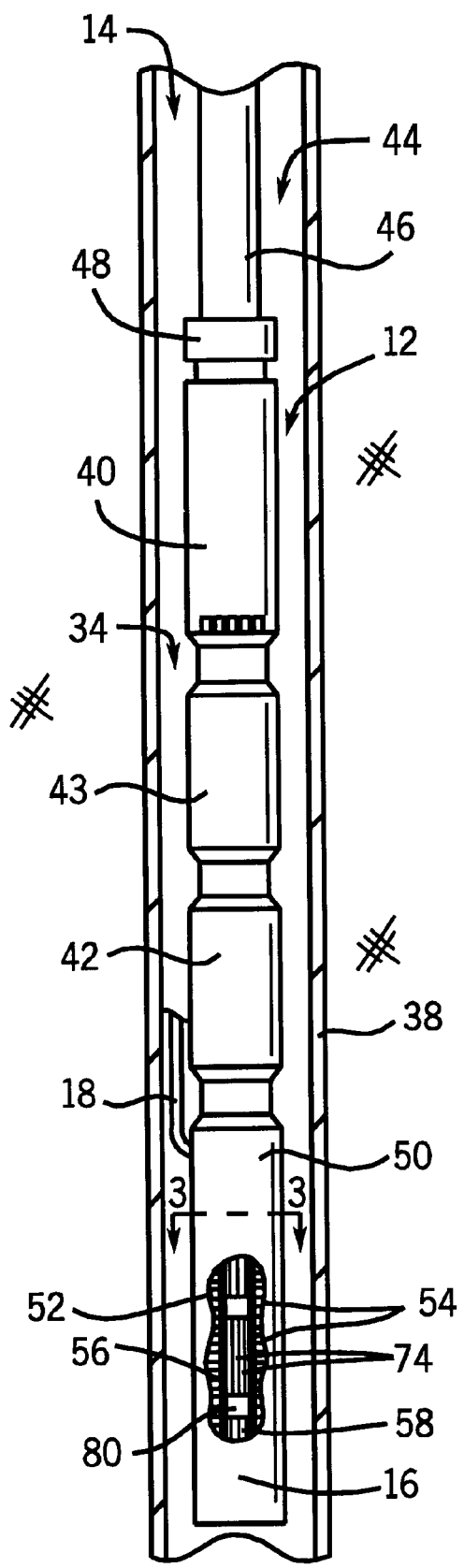
FIG. 2 is a front elevational view of a submersible pumping system utilizing an elongated motor, according to a preferred embodiment of the present invention.

A typical application of electric motor 16 is described with reference to FIGS. 2 through 4. As illustrated best in FIG. 2, motor 16 is disposed in an exemplary progressive cavity pumping system 12. Elongated motor 16 is particularly amenable for use in environments that require a relatively long but narrow physical configuration of the motor, e.g. within a wellbore. In this application, system 12 is designed for deployment in a well 34 within a geological formation 36 containing desirable production fluids, such as petroleum. The wellbore 14 is drilled into geological formation 36 and aligned with a wellbore casing 38. System 12 is deployed within wellbore 14 to a desired location for pumping of the wellbore fluids.

The illustrated progressive cavity pumping system 12 also includes other components. For example, motor 16 powers a progressive cavity pump 40, and is protected by a motor protector 42. Motor protector 42 is designed to protect motor 16 from contamination by wellbore fluids, and to permit equalization of the internal pressure of motor 16 with the external pressure in wellbore 14. A thrust chamber 43 is disposed between protector 42 and pump 40. However, because system 10 permits the use of a permanent magnet synchronous motor 16, the rotational speed is relatively slow, e.g. in the 12 to 40 Hz range, pumping system 12 does not require a speed reducing gearbox. In other words, the output of motor 16 can be used to directly power pump 40 without the expense of adding a gearbox, as in prior art progressive cavity pump systems. This can substantially reduce the cost of pumping system 12 and also removes one more component that would otherwise be susceptible to wear or breakage.

Progressive cavity pumping system 12 typically is suspended in wellbore 14 by a deployment system 44, such as coil tubing, cable or the illustrated production tubing 46. Deployment system 44 is connected to progressive cavity pumping system 12 by an appropriate head or connector 48. Furthermore, power is supplied to elongated motor 16 by power cable 18, which is routed along deployment system 44 from the earth's surface.

Motor 16 preferably comprises an elongated housing 50 that is generally tubular in shape. Disposed within elongated housing 50 is a core or stator 52 that includes a plurality of windings 54. The combined stator 52 and windings 54 typically are formed from a plurality of plates or laminations having conductive coils extending longitudinally therethrough.

Figure 3:
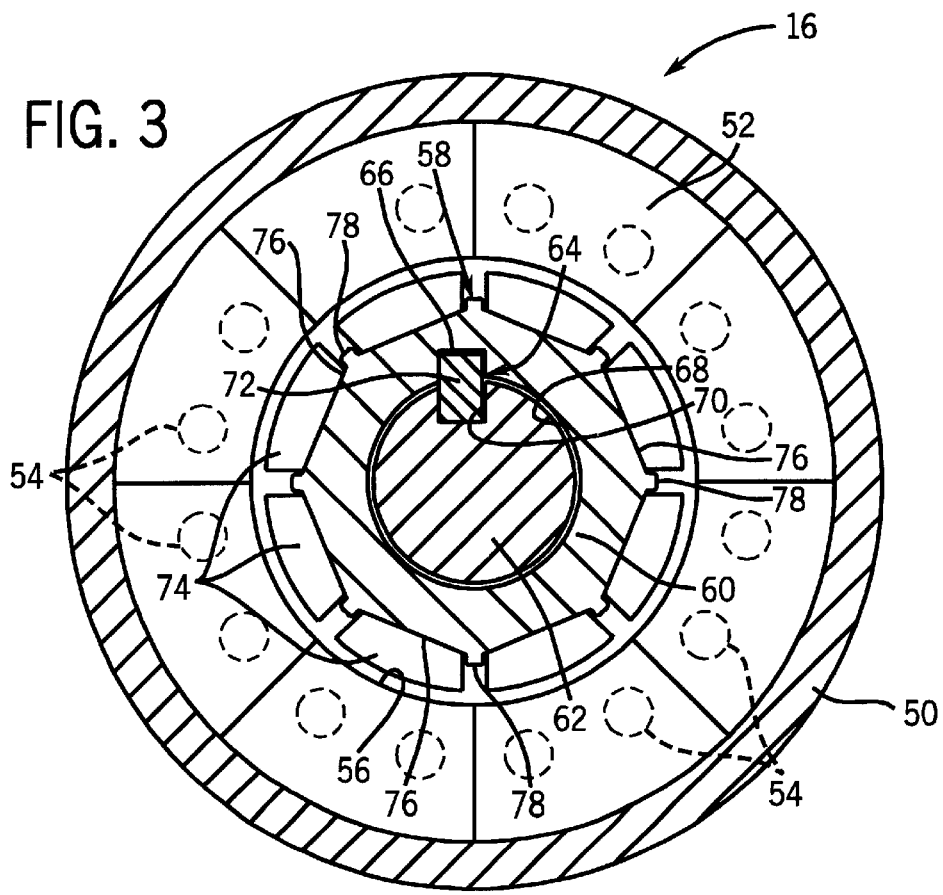
FIG. 3 is a cross-sectional view of the electric motor, taken generally along line 3—3 of FIG. 2.

As illustrated further in FIG. 3, stator 52 includes a central, longitudinal opening 56 sized to rotatably receive a rotor assembly 58. Rotor assembly 58 includes a plurality of rotor sections 60 (see also FIG. 4). Rotor sections 60 are mounted over a drive or driving shaft 62. Each rotor section 60 is prevented from moving rotationally with respect to shaft 62 by a relative rotation prevention system 64. An exemplary rotation prevention system 64 is a key and keyway system in which each rotor section 60 includes a keyway 66 that extends radially outward from an inner, axial rotor opening 68 sized to receive drive shaft 62.

Additionally, drive shaft 62 includes one or more cooperating keyways 70 that extend into drive shaft 62 in a radially inward direction. The one or more keyways 70 are disposed for cooperation with each rotor section 60. A key 72 is sized for receipt in keyways 66 and 70 at each rotor section 60 to prevent rotational movement of that rotor section relative to drive shaft 62. If a single keyway 70 is disposed along shaft 62, a single key can be used along the drive shaft 62 or individual keys at each rotor section 60.

If rotor assembly 58 is utilized in a permanent magnet synchronous motor, each rotor section 60 includes a plurality of permanent magnets 74. Permanent magnets 74 are elongated magnets that lie generally parallel with drive shaft 62 and the axis about which it rotates. Each rotor section 60 is designed with a plurality of seats 76 that run longitudinally along the corresponding rotor section 60. Each seat 76 is sized to receive a corresponding permanent magnet 74. In the preferred embodiment, the plurality of seats 76 may include, for example, eight seats 76 for receiving eight permanent magnets 74. Each seat area 76 is divided from adjacent seat areas 76 by longitudinal ribs 78. Permanent magnets 74 may be affixed to their respective seats 76 by, for example, an adhesive bonding. Drive shaft 62 and the plurality of rotor sections 60 preferably are supported by appropriate bearing sets 80 (see FIGS. 2 and 4) disposed between adjacent rotor sections 60.

During operation, the windings 54 of stator 52 are energized in a temporal sequence. This provides a magnetic field that moves either clockwise or counterclockwise around the core or stator 52. The moving field intersects with the flux field of the permanent magnets 74 and causes rotor assembly 58 to rotate in the desired direction.

As discussed above, a problem with elongated motors, such as permanent magnet synchronous motor 16, is that drive shaft 62 twists under operating load. In other words, once motor 16 is operating, the opposing ends of drive shaft 62 are angularly displaced from one another relative to their position when motor 16 is not operating. This leads to poor cooperation between the magnetic field moving through stator 52 and the location of permanent magnets 74. The permanent magnets 74 of at least some of the rotor sections 60 are at non-optimal positions relative to stator 52, resulting in reduced output power and inefficient operation of motor 16.

Figure 4:
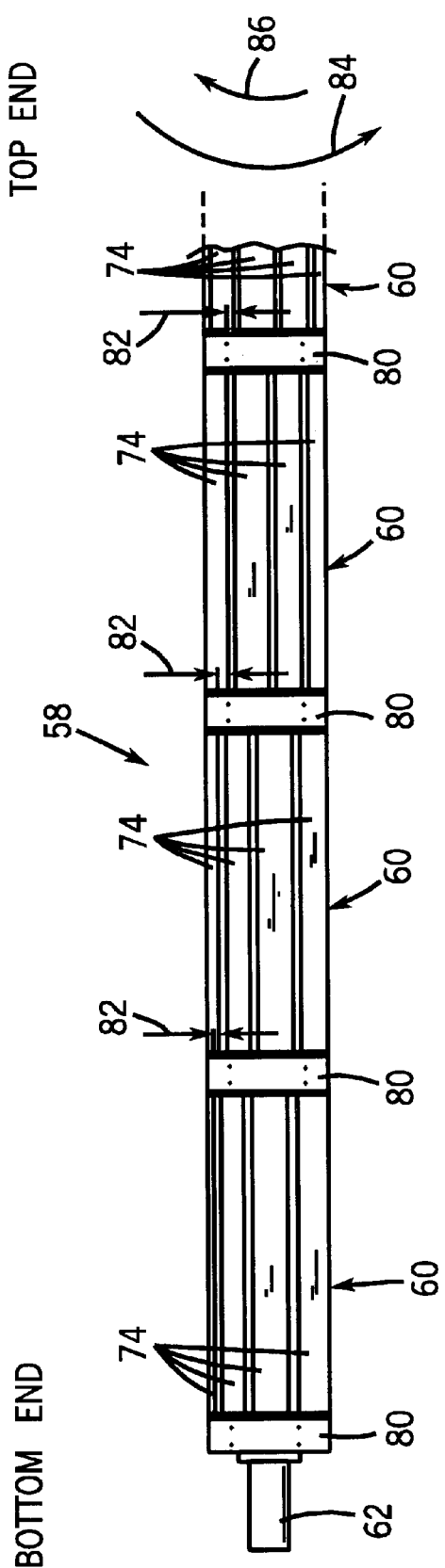
FIG. 4 is a side view of a rotor assembly utilized with the motor illustrated in FIG. 2.

As illustrated in FIG. 4, at least some of the rotor sections 60 are angularly offset from each other to compensate for the twisting drive shaft 62. Specifically, the permanent magnets 74 of sequential rotor sections 60 are offset from one another by a given offset 82. The actual angular distance of each offset 82 depends on the torque carried by the shaft, the number of rotor sections 60, and the number of rotor sections that are actually offset from each other. For example, if rotor assembly 58 includes ten rotor sections 60, and the load application on motor 16 angularly displaces, i.e., twists, shaft 62 by, for example, 30 degrees, then the sum of offsets 82 preferably is approximately 30 degrees. If the exemplary motor 16 utilizes ten rotor sections 60, then each rotor section can be displaced approximately three degrees from the position of the next adjacent rotor for an offset sum that equals approximately 30 degrees. If some of the rotors are not offset or if the number of rotors is greater or less than ten, the angular distance of each offset 82 is adjusted accordingly to reach a desired offset sum, e.g. 30 degrees.

The angular direction or progression of offsets 82 is designed to compensate for shaft twist. For example, if rotor assembly is rotated in the direction of arrow 84 in FIG. 4, then a load applied to shaft 62 in the direction of arrow 86 (at the indicated Top End) tends to twist shaft 62 in the direction of arrow 86. This twisting of shaft 62 tends to remove the offsets 82 between rotor sections 60. In other words, the predetermined shaft twist tends to align magnets 74 of sequential rotor sections 60 for optimization of motor performance under load.

Figure 5:
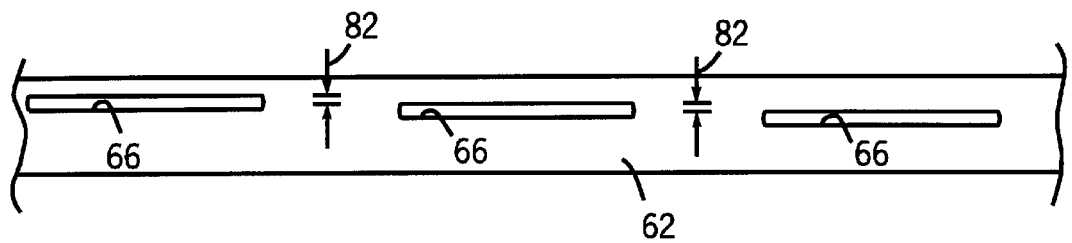
FIG. 5 is a side view of a shaft having a plurality of offset keyways to accommodate offset rotor sections.

The permanent magnets 74 of sequential rotor sections 60 can be offset in a variety of ways. However, one method is to offset the keyways 70 along shaft 62 to control the offset of each rotor section. Referring to FIG. 5, a portion of shaft 62 is illustrated to include a plurality of keyways 66 that are angularly displaced from each other a distance equal to offsets 82. Thus, when rotor sections 60 are assembled over shaft 62 the corresponding key 72 and rotor section keyway 66 cooperate to hold specific rotor sections at the desired angular position. Thus, rotor assembly 58 can be readily designed for a given load and resultant angular displacement of shaft 62.

Figure 6:
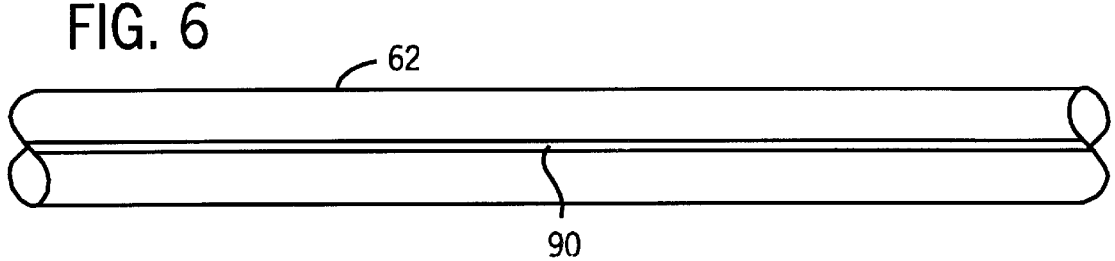
FIG. 6 is a side view of an alternate shaft having a single keyway.
Figure 7:
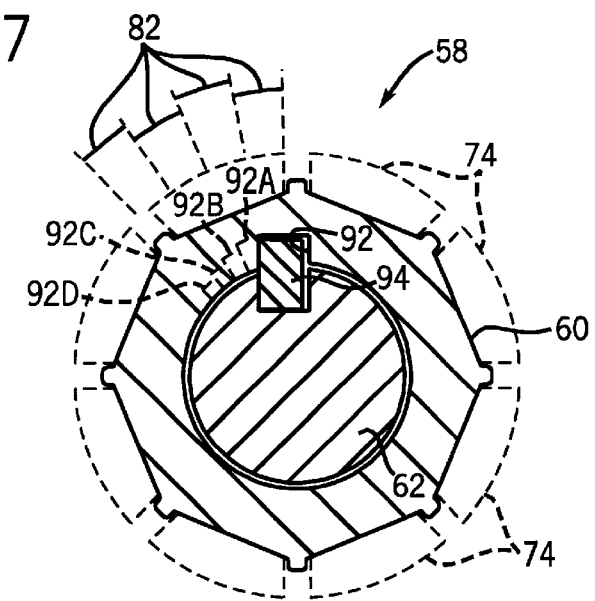
FIG. 7 illustrates rotor sections having offset keyways to provide offset rotor sections.

An alternate embodiment of rotor assembly 58 is illustrated in FIGS. 6 and 7. In this embodiment, shaft 62 includes a linear keyway 90 that preferably extends along the length of the shaft. The linear keyway tends to be less expensive to manufacture relative to a plurality of offset keyways.

In this embodiment, the offsets 82 are created by forming a linear keyway 92 in each rotor section 60 at a unique angular position. Instead of angularly offsetting the magnets 74 of sequential rotor sections by offset keyways on the shaft, the keyway 92 formed in each rotor section 60 is disposed at a unique location relative to position 74. An exemplary group of offset rotor keyways 92 is indicated in FIG. 7 by the keyway 92 and the dashed-line keyways 92A–92D. The phantom keyways represented by reference numerals 92A–92D show the angular position of keyways relative to magnets 74 in sequential rotor sections. Of course, when each of the rotor sections is disposed over shaft 62 and held in rotational position by a key 94, keyways 92, 92A, 92B, 92C, and 92D are aligned and magnets 74 of sequential rotor sections 60 are offset by the predetermined offset 82. Once the shaft is under normal operating load and consequential shaft twist, the magnets 74 of sequential rotor section 60 are generally aligned to optimize motor performance.

It will be understood that the foregoing description is of preferred exemplary embodiments of this invention, and that the invention is not limited to the specific forms shown. For example, a variety of control systems can be used to provide alternating current to the submersible pumping system; a wide range of motor lengths and diameters can benefit from the present invention; the design and number of rotor sections utilized may vary from one application to another; motors other than permanent magnet synchronous motors may benefit from the utilization of offset rotors; and the unique electric motor may be utilized in applications other than submersible pumping systems. These and other modifications may be made in the design and arrangement of the elements without departing from the scope of the invention as expressed in the appended claims.

What is claimed is:

1. A permanent magnet synchronous motor system, comprising:

a permanent magnet synchronous motor having an elongated housing; a stator having a plurality of windings; and a rotor rotatably disposed within the stator, the rotor including a plurality of rotor sections, each rotor section including a plurality of permanent magnets, the permanent magnets of adjacent rotor sections being offset from each other a predetermined angular displacement, the plurality of rotor sections being mounted over a shaft with each rotor section rotatably fixed with respect to the shaft by a corresponding key and keyway, wherein the shaft includes a plurality of keyways, each keyway being at an axially unique location and being offset from each adjacent keyway by the predetermined angular displacement.

2. The permanent magnet synchronous motor system as recited in claim 1, further comprising a progressive cavity pump powered by the permanent magnet synchronous motor.

3. The permanent magnet synchronous motor system as recited in claim 2, further comprising a motor protector coupled to the permanent magnet synchronous motor.

4. The permanent magnet synchronous motor system as recited in claim 3, further comprising a variable speed drive electrically connected to the permanent magnet synchronous motor.

5. The permanent magnet synchronous motor system as recited in claim 4, wherein the variable speed drive is at a location remote from the permanent magnet synchronous motor and the permanent magnet synchronous motor is self-starting.

6. The permanent magnet synchronous motor system as recited in claim 5, wherein the permanent magnet synchronous motor is positioned in a wellbore and the variable speed drive is positioned outside of the wellbore.

7. The permanent magnet synchronous motor system as recited in claim 1, wherein the permanent magnets of adjacent rotor sections are offset by offsetting each corresponding key and keyway relative to the next adjacent key and keyway.

8. The permanent magnet synchronous motor system as recited in claim 7, wherein each rotor section includes a keyway disposed at a unique angular position relative to the rotor section's permanent magnets.

9. A permanent magnet motor downhole pumping system designed for use within a wellbore, comprising:

a downhole pump; and a permanent magnet motor coupled to the downhole pump, wherein the downhole pump and the permanent magnet motor are designed for deployment in a wellbore to pump a wellbore fluid, and wherein the permanent magnet motor includes a plurality of rotor sections, each rotor section having a plurality of permanent magnets, the permanent magnets of adjacent rotor sections being offset from each other by a predetermined angular displacement, wherein the sum of the predetermined angular displacements between each rotor section is approximately equal to the angular twisting of the shaft under a standard load.

10. The permanent magnet motor downhole pumping system as recited in claim 9, further comprising:

a power supply able to output a three-phase alternating current;

a variable speed drive; and a power cable connecting the variable speed drive to the permanent magnet motor.

11. The permanent magnet motor downhole pumping system as recited in claim 10, wherein the permanent magnet motor is an eight pole, self-starting motor.

12. The permanent magnet motor downhole pumping system as recited in claim 11, wherein the permanent magnet motor includes a drive shaft on which the plurality of rotor sections are mounted.

13. The permanent magnet motor downhole pumping system as recited in claim 9, wherein the drive shaft includes a plurality of keyways that are angularly offset from each other.

14. The permanent magnet motor downhole pumping system as recited in claim 9, wherein each rotor section includes a keyway disposed at a unique angular position relative to the rotor section's permanent magnets.

15. The permanent magnet motor downhole pumping system as recited in claim 9, wherein the power supply comprises a variable speed drive.

16. A progressive cavity pumping system, comprising:

a progressive cavity pump; and a permanent magnet synchronous motor coupled to the progressive cavity pump, wherein the permanent magnet synchronous motor includes a plurality of rotor sections, each rotor section having a plurality of permanent magnets, the permanent magnets of adjacent rotor sections being offset from each other by a predetermined angular displacement, wherein the sum of the predetermined angular displacements between each rotor section is approximately equal to the angular twisting of the shaft under a standard load.

17. The progressive cavity pumping system, as recited in claim 16, wherein the rotational speed of the permanent magnet synchronous motor and the progressive cavity pump are generally at a 1:1 ratio.

18. The progressive cavity pumping system, as recited in claim 17, further comprising a motor protector coupled to the permanent magnet synchronous motor.

19. The progressive cavity pumping system, as recited in claim 18, further comprising a thrust chamber coupled to the progressive cavity pump.

20. The progressive cavity pumping system, as recited in claim 17, further comprising a variable speed drive electrically connected to the permanent magnet synchronous motor.

21. The progressive cavity pumping system, as recited in claim 17, wherein the permanent magnet synchronous motor includes a drive shaft on which the plurality of rotor sections are mounted.

22. The progressive cavity pumping system, as recited in claim 16, wherein each rotor section includes a keyway disposed at a unique angular position relative to the rotor section's permanent magnets.

\* \* \* \* \*